United States Patent [19]

Bagatto et al.

[11] Patent Number: 5,080,803
[45] Date of Patent: Jan. 14, 1992

[54] PROCESS FOR DECANTATION OF SUSPENSIONS

[75] Inventors: Peter F. Bagatto, Jonquiere; Bernard P. Dancose, Chicoutimi; Pierre C. Harrington, Jonquiere; Gaston M. Jean, Chicoutimi; Marc A. Lepage, Jonquiere, all of Canada

[73] Assignee: Alcan International Limited, Montreal, Canada

[21] Appl. No.: 659,456

[22] Filed: Feb. 21, 1991

Related U.S. Application Data

[62] Division of Ser. No. 421,268, Oct. 13, 1989, abandoned.

[51] Int. Cl.⁵ .................................... B01D 21/06
[52] U.S. Cl. .................. 210/709; 210/737; 210/744; 210/803; 423/121
[58] Field of Search .......... 210/702, 709, 737, 801, 210/803, 744; 423/121

[56] References Cited

U.S. PATENT DOCUMENTS

| | | | |
|---|---|---|---|
| 2,107,919 | 2/1938 | Turner et al. | 423/121 |
| 3,300,047 | 1/1967 | Hirsch | 210/519 |
| 3,523,889 | 8/1970 | Eis | 210/713 |
| 3,628,667 | 12/1971 | Somora et al. | 210/519 |
| 3,684,092 | 8/1972 | Busse et al. | 210/800 |
| 4,226,714 | 10/1980 | Furness et al. | 210/96.1 |
| 4,545,902 | 10/1985 | Connelly et al. | 210/734 |
| 4,603,000 | 7/1986 | Casey | 210/715 |
| 4,830,507 | 5/1989 | Bagatto et al. | 210/96.1 |
| 5,008,089 | 4/1991 | Moody et al. | 210/734 |

FOREIGN PATENT DOCUMENTS 2102646 8/1972 Fed. Rep. of Germany.

Primary Examiner—Peter Hruskoci
Attorney, Agent, or Firm—Cooper & Dunham

[57] ABSTRACT

A process and apparatus useful for decanting suspensions at temperatures at and above the atmospheric boiling point of the liquid of the suspension are disclosed. The apparatus is in the form of a vertically elongated vessel of high height to diameter ratio having a cylindrical upper section and a bottom section and arranged to be filled to a predetermined liquid level in an upper region of said cylindrical section; feed means for feeding a suspension into the cylindrical section in a mid-region between the bottom of the vessel and said liquid level, said feed means including means for injecting the feed under a positive pressure sufficient to overcome the hydrostatic head of the liquid in the vessel above the feed inlet; means for adding a flocculant to the suspension feed; liquid outlet means in an upper region of the cylindrical section at or below said liquid level for drawing off clarified liquid; solids discharge means at the bottom of said vessel; means for controlling a slurry-clarified liquid interface at a predetermined level in a lower region of said cylindrical portion below the feed inlet and rotatable rake means in the bottom section adapted to remold the sedimented solids and continuously expose renewed surfaces. It is particularly useful for clarifying caustic liquor containing red mud residues from the Bayer process.

4 Claims, 1 Drawing Sheet

PROCESS FOR DECANTATION OF SUSPENSIONS

This is a division of application Ser. No. 421,268, filed Oct. 13, 1989, now abandoned.

BACKGROUND OF THE INVENTION

This invention relates generally to the decantation of suspension, and more particularly to a process and apparatus for decanting at temperatures at and above the atmospheric boiling point of the liquid.

Decantation systems of the general type described herein are already known and are often referred to as continuous thickeners. The purpose of such systems is to obtain sedimentation, i.e. gravitational settling of solid particles suspended in a liquid. The settled solid particles are withdrawn at the bottom of the apparatus and the clarified liquid, freed from the solid particles, is withdrawn from the top of the apparatus.

Somora et al U.S. Pat. No. 3,628,667 described a decantation apparatus in the form of a horizontally elongated vessel (Col. 1, lines 66 to 68), of height approximately equal to width, in which a slurry inlet is positioned below the surface of the liquid inside the vessel. The discharge of clarified liquors is by launders located at the surface of the liquid, and a slurry feed enters the apparatus at effectively atmospheric pressure, since it is dispensed from a feed well open to the atmosphere. The basic concept resides in the fact that the suspension to be clarified is distributed in a distribution chamber and loading well evenly over the entire length of the decantation vessel (Col. 2, lines 62 to 64) which is realized by a distributor chamber extending lengthwise of the vessel substantially coextensive therewith in the top section (Col. 1, lines 74 to Col. 2, line 2).

In Casey, U.S. Pat. No. 4,603,000, there is described an apparatus and process for flocculating and clarifying a solid-liquid slurry in a vertically oriented apparatus whose height is approximately equal to its diameter. An inlet for the deaerated and flocculated slurry is provided below the surface of the liquid inside the vessel and below the surface of the mud bed (Col. 2, line 48). Furthermore, the apparatus includes a preflocculating vessel extending into the top, and arranged coaxially with the clarifier tank (Col. 2 to Col 13 line 21). A flocculating agent is added to the slurry as it passes downwardly under laminar flow through a vertical pipe arranged coaxially with the clarifier vessel. The direction of flow then is changed to become upwardly through a lower chamber for the formation of the flocs, and then its direction is changed again to flow downwardly through an annular passage surrounding the lower chamber and finally is introduced below the surface of the mud bed (Col. 3, lines 8 to 21). This apparatus includes a conical bottom section fitted with a slowly rotating rake that grazes the inner surfaces of the lower portion of the vessel. The discharge of clarified liquor is by launders located at the surface of the liquid, and the feed slurry is effectively at atmospheric pressure, since it is dispensed from a feed well open to the atmosphere.

Spetz, German OS 2 212 646, published Aug. 3, 1972, describes a vertically oriented cylindrical decanter of height smaller than the diameter, having inlets for the feed slurry located below the surface of the liquid, just above the upper surface of the mud bed. The exit of clarified liquor is by launders located at the surface of the liquid and the entry of the feed slurry is effectively at atmospheric pressure, since it is dispensed from a feed well open to the atmosphere.

In alumina plants, associated with the production of aluminum, there is a need for an improved system for separating finely divided red mud solids from digestion liquors. It is the object of the present invention to provide a means whereby finely divided solids can be rapidly separated from a slurry at temperatures above the boiling point of the liquid.

SUMMARY OF THE INVENTION

One embodiment of this invention relates to a decantation apparatus which comprises a vertically elongated vessel having a cylindrical upper section and a bottom section and arranged to be filled to a predetermined liquid level in an upper region of the cylindrical upper section. Feed means are provided for feeding a suspension into the cylindrical section in a mid-region between the bottom of the vessel and the liquid level. Means are also provided for adding a flocculant to the suspension feed. A liquid outlet means is provided in an upper region of the cylindrical section below the liquid level for drawing off clarified liquid. A solids discharge is provided at the bottom of the vessel and means are also provided for controlling a solids component-liquid component interface at a predetermined level in a lower region of the cylindrical portion below the inlet. A rotatable rake means is provided in the bottom section and is adapted to remold the sedimented solids.

The apparatus is preferably tall relative to its diameter and typically has a height:diameter ratio of about 3 to 2:1. The liquid outlet may be at the predetermined liquid level or a distance below the liquid level, e.g. about 0.5-1.0 H, preferably 0.7-1.0 H, from the bottom of the vessel, where H is the height between the bottom of the bottom section and the liquid level. Of course, the outlet must always be above the inlet. The bottom section may have a variety of shapes, e.g. dished or flat.

Another embodiment of this invention comprises a process for flocculating and clarifying a solid-liquid suspension comprising the steps of providing an elongated vessel having a cylindrical upper section and a dished or flat bottom section and maintaining a liquid level in the vessel in an upper region of the cylindrical upper section. A suspension is fed into the cylindrical section in a mid-region between the bottom of the vessel and the liquid level, this suspension being fed under a positive pressure sufficient to overcome the hydrostatic head of the liquid in the vessel above the feed inlet. A flocculant is added to the suspension feed just before it is fed into the vessel and clarified liquid is drawn off from an upper region of the cylindrical section at or below the liquid level. The solids are discharged from the bottom of the vessel. A slurry-clarified liquid interface is maintained at a predetermined level in a lower region of the cylindrical portion below the feed inlet and the bottom section is continuously raked with a rotating rake means which moves through the deposited solids and remolds them, thereby preventing build-up of solids.

With the system of this invention, the height of liquor above the inlet and outlet points supplies a hydrostatic head in the vessel open to the atmosphere such as to permit the temperature of the suspension entering and the liquor leaving the vessel to be slightly above or at the atmospheric boiling point, without most of the contents of the vessel boiling, which would otherwise cause turbulence and reduce the rapidity of settling of the solids. Only the surface of the liquor, and the region just below the surface is slightly turbulent and appears to simmer, but the bulk of the liquor is quiescent. Being able to operate at and slightly above the atmospheric boiling point of the liquid has important advantages in that at higher temperatures the viscosity of the liquid is lower and rate of sedimentation is higher than at lower temperatures. Also, at higher temperatures the rate at which finely divided solids react with a flocculating agent is much more rapid than at lower temperatures. Furthermore, the operation at high temperatures, together with the continuous remolding of the deposited solids in the region of the bottom of the vessel by the rake reduces the build-up of scale, avoids "rat holing" and promotes formation of thick residue.

The above advantages are also obtained with outlet points which are located at the surface of the liquor in the vessel. With this arrangement, the discharge can be an uncontrolled gravity discharge and this eliminates any need for an outlet line control valve. With the gravity discharge, the temperature of the liquor discharging from the vessel is preferably maintained substantially at the atmospheric boiling point.

When separating red mud from caustic digestion liquors of the Bayer process, the high temperatures have the advantage of providing a reduced rate of precipitation of dissolved alumina from a supersaturated solution. Normally, the alumina precipitates out as gibbsite ($Al_2O_3.3H_2O$), and this is lost with the muds. The removal of the alumina from the solution represents a significant financial loss which can be avoided with the process of this invention which provides high temperatures and short residence times.

The suspension feed is preferably fed into the vessel at a temperature of about 106° to 108° C., but higher or lower temperatures may be used.

DESCRIPTION OF THE PREFERRED EMBODIMENTS

Figure 1:
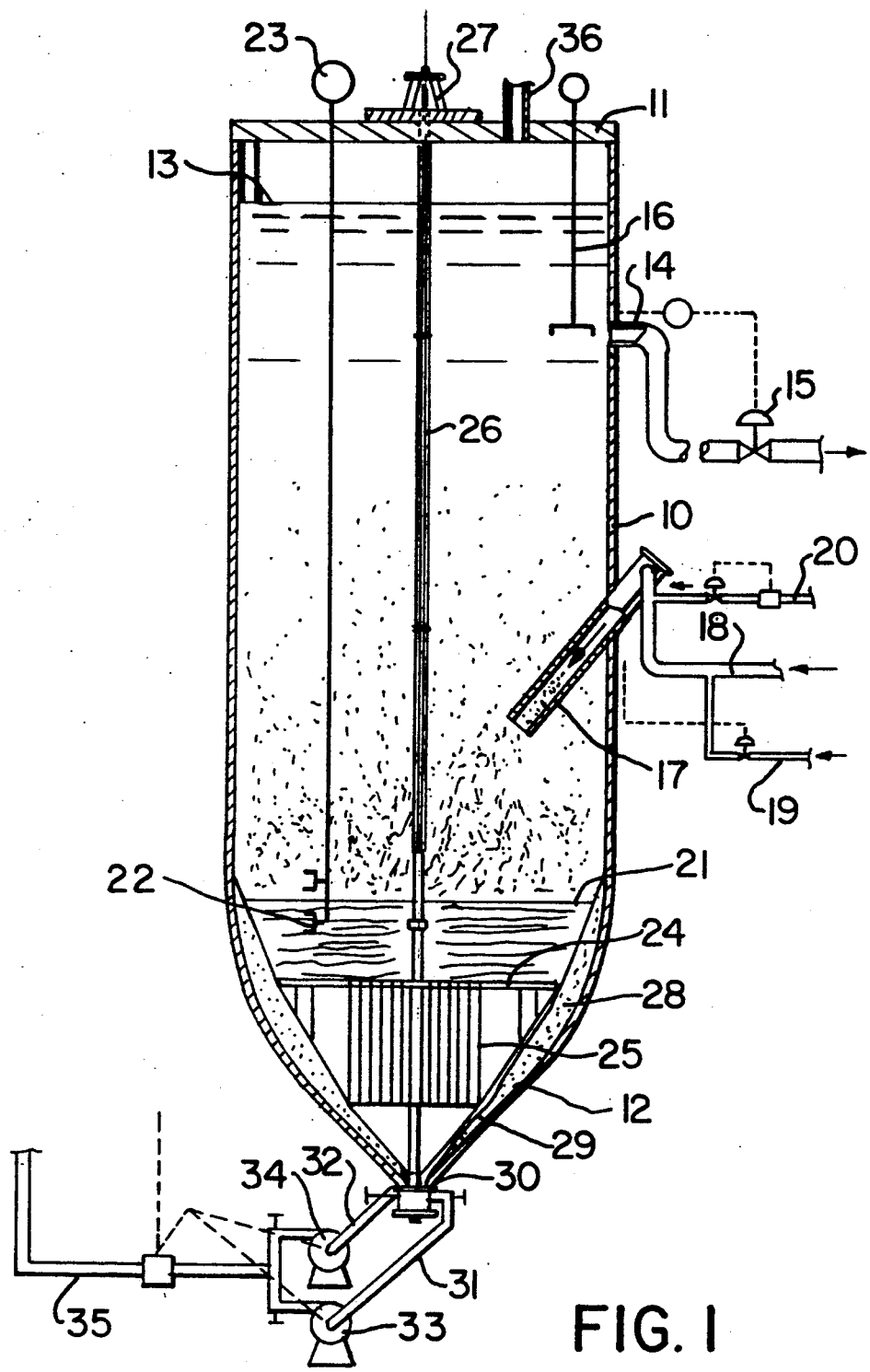
FIG. 1 is a diagrammatic cross-section through an apparatus according to the present invention.

One embodiment of the apparatus of the invention is shown in FIG. 1 and this is in the form of a relatively tall vessel having a cylindrical portion 10 and a bottom dished portion 12. In one successful industrial embodiment, the vessel has a height of 23 m and a diameter of approximately 8 m with a dished bottom. The vessel is designed to operate at atmospheric pressure and is closed by a cover plate 11, which is vented to the atmosphere via vent 36. The walls and cover plate are preferably insulated to prevent heat losses, reduce scale growth and improve working conditions for the operating personnel.

A liquid level 13 is maintained in the vessel by controlling flow rates. Clarified liquid is drawn off from the vessel through an outlet 14 positioned below the liquid level 13. Control valve 15 can be used to vary the rate of discharge through outlet 14 to maintain the liquid level 13 at the desired level. The clarity of the liquor is monitored by a clarity meter 16, which may be an infrared or ultrasonic detector.

The feed suspension is fed into the vessel through inlet tube 17 which is directed in a downward slope into the vessel, to direct the solids towards the center of the vessel. This tube 17 is connected to a suspension inlet line 18. It is desirable to maintain the temperature of the feed suspension within quite close tolerances and this temperature can be maintained by adding cooling liquor from another process stream through inlet line 19. A commercial flocculant is added to suspension feed line 18 by means of flocculant inlet line 20.

An interface 21 between slurry and clarified liquid is carefully maintained at a predetermined level by means of level sensors 22 and readout device 23.

In the dished section 12 there is provided a rotatable rake mechanism 24 with downwardly extending arms 25 arranged in a triangular configuration to be positioned relatively close to the inner conical wall of the vessel. The rake 24 is rotated by shaft 26 and motor/gear mechanism 27. This rake is similar to that disclosed in U.S. Pat. No. 4,830,507.

The rake is typically positioned with the arm extremities about 15 to 30 cm from the inner wall of the bottom section, but other clearances may be used. Between the rake and the bottom section wall is a solids layer 28 consisting of stagnant mud. This mud is constantly remolded by the rake arms, thereby constantly exposing renewed surface 29 and preventing further build-up of solids.

At the bottom of the vessel is a discharge outlet 30 for discharging mud 28. Two draw off lines 31 and 32 are shown with corresponding pumps 33 and 34. One of these lines and pumps represents a spare. The outlets from the pumps is discharged through mud line 35.

In an alternative embodiment (not shown) of the apparatus described above, the outlet 14 is aligned with the liquid level 13. With this arrangement, the outlet 14 is in the form of an uncontrolled gravity discharge and the control valve 15 is eliminated. The remainder of the apparatus remains as shown in FIG. 1.

A preferred operating technique is illustrated by the following example:

EXAMPLE 1

A test was carried out using the apparatus shown in FIG. 1. The feedstock was a slurry obtained from the Bayer process produced by digesting bauxite with caustic solution to extract the alumina values. The feed slurry had a density of 1.23 T/m$^3$ and a solids content of 2.37%. The feedstock was fed into the apparatus at a rate of 714 m$^3$/hr.

The caustic liquor contained 145 g/l of dissolved $Al_2O_3$ and 220 g/l of total caustic, as $Na_2CO_3$. The liquor temperature was 108° C.

A flocculant was added with the feedstock. It was 100% anionicity sodium polyacrylate, available from Allied Colloids under the trade mark ALCLAR 600. The concentration of the flocculant solution was 1.6-2.5 g/l and it was added at a rate of 60 g/T of dry red mud. This resulted in the flow rate of about 480 to 750 l/hr.

The cooling fluid which was added with the feedstock was a caustic wash liquor and this was used at a variable flow rate of 0 to 50 m$^3$/hr. The cooling fluid had a density of 1.12 T/m$^3$, a temperature of 50°-60° C. and a total caustic (expressed as $Na_2CO_3$) of about 100-120 g/l.

This arrangement provided an overflow through outlet 14 which was a clear liquor flowing at a rate of 684 m$^3$/hr. The overflow liquor had a density of 1.22 T/m$^3$ and a solids content of 0.2% (200 mg/l). The temperature of the overflow liquid was 106.5°-107° C.

The solids discharge through outlet 30 had a density of 1.60 T/m$^3$ and a solids content of 40%. This solids underflow discharged at a rate of 30 m$^3$/hr and was at a temperature of 105°-106° C.

Although the present invention has been described and illustrated with respect to preferred features thereof, it is to be understood that various modifications and changes may be made to the specifically described and illustrated features without departing from the scope of the present invention.

We claim:

1. A process for flocculating and clarifying a solid-liquid suspension containing finely divided solids, said process comprising the steps of providing a vertically elongated vessel having a height to diameter ratio of at least 2:1 and having a cylindrical upper section and a tapered bottom section, said vessel being open to the atmosphere and operating at atmospheric pressure; maintaining a liquid level in said vessel in an upper region of said cylindrical top section; feeding a solid-liquid suspension through an inlet in a downward direction into the cylindrical section in a mid-region thereof between the bottom of the vessel and said liquid level, said suspension being fed under a positive pressure sufficient to overcome the hydrostatic head of the liquid in the vessel above the feed inlet and said suspension in the vessel being at a temperature above the atmospheric boiling point of the liquid, with the liquid immediately adjacent the surface of said liquid level being slightly turbulent and the remainder of the liquid remaining substantially quiescent; adding a flocculant to the suspension feed before it is fed into the vessel to thereby form solid agglomerates of said finely divided solids, said agglomerates settling to the bottom of the vessel in the form of a slurry; drawing off clarified liquid through an outlet from an upper region of the cylindrical section at or below the liquid level and discharging solids from the bottom of the vessel to thereby maintain a slurry-clarified liquor interface at a predetermined level in a lower region of the cylindrical portion below the feed inlet and raking the bottom section with a rotating rake means which remolds sedimented solids and continuously expose renewed surfaces.

2. A process according to claim 1 wherein the suspension feed enters the vessel at a temperature of about 106° to 108° C.

3. A process according to claim 1 wherein the clarified liquid is drawn off at the liquid level.

4. A process according to claim 1 wherein the solid-liquid suspension to be clarified is a caustic liquor containing red mud residues from the Bayer process.

* * * * *